Dec. 7, 1937.  L. BENSON  2,101,788
TRAP
Filed May 18, 1937   3 Sheets-Sheet 1

Inventor
L. Benson

Dec. 7, 1937.    L. BENSON    2,101,788
TRAP
Filed May 18, 1937    3 Sheets-Sheet 2

Inventor
L. Benson
By C. A. Snow & Co.
Attorneys

Dec. 7, 1937.  L. BENSON  2,101,788

TRAP

Filed May 18, 1937  3 Sheets-Sheet 3

Inventor
L. Benson
By CA Knowles
Attorneys.

Patented Dec. 7, 1937

2,101,788

UNITED STATES PATENT OFFICE 2,101,788

TRAP

Lew Benson, San Francisco, Calif., assignor of one-half to Arthur C. Benson, Glendale, Calif.; one-sixteenth to Lesley Dallas Benson, Tillimook, Oreg.; one-sixteenth to John Benson, Phillipsburg, Kans.; one-sixteenth to Bert O. Benson, one-sixteenth to Charl. Benson, one-sixteenth to William Benson, all of Vennes, Calif.; and one-sixteenth to Karl Mudge, East St. Louis, Ill Application May 18, 1937, Serial No. 143,351

3 Claims. (Cl. 43—74)

This invention relates to traps designed primarily for catching rats, mice, and other rodents, one of the objects being to provide a trap which is self-setting and acts automatically, when tripped, to sweep the trapped rodent away from the entrance to the trap and toward an exit opening into a holder for the rodent.

A further object is to provide novel means for holding and releasing the gate member of the trap, the action thereof being controlled by the rodent entering the trap.

A still further object is to provide a combined bait-pan and trigger which is adjustable to properly support bait of different weights.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
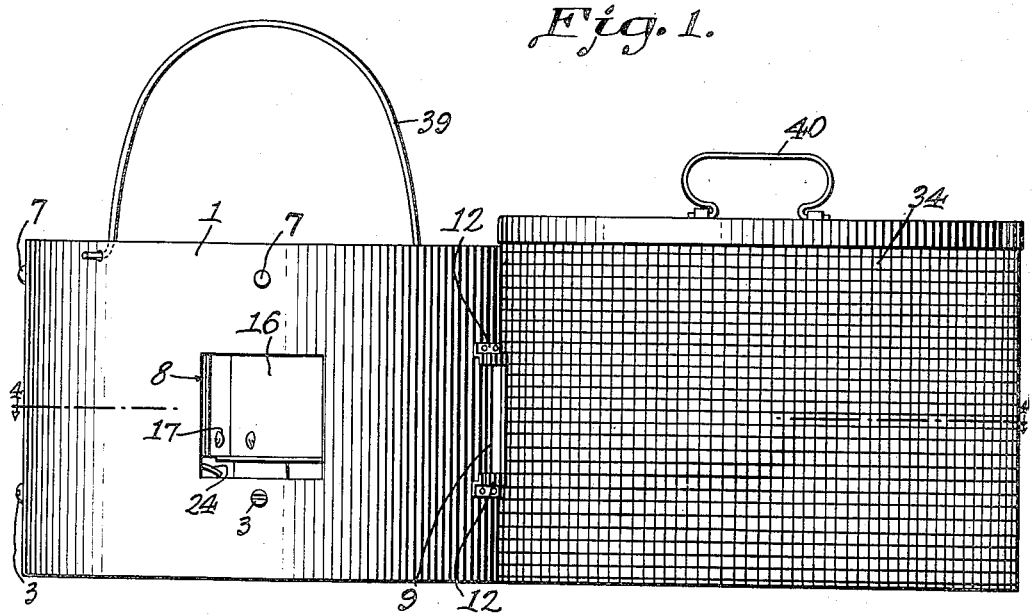
Figure 1 is a front elevation of the complete trap.

Referring to the figures by characters of reference 1 designates the receiving section of the trap which is preferably cylindrical and formed of sheet metal or the like, this section being provided with a bottom plate 2 elevated above the bottom of the wall of the section and held thereto by suitable fastening devices 3 extending through a depending flange 4 on the bottom. The upper end of the receiving section 1 has a top plate 5 fitted therein and formed with an upwardly extending annular flange 6 held to the wall of the section by small bolts or other fastening means indicated at 7.

An inlet opening 8 is formed in the wall of section 1 between the top and bottom thereof and an outlet opening 9 is also provided in said wall between the top and bottom, the two openings being spaced apart substantially ninety degrees. A guide member 10 is secured to the wall of section 1 at one side of outlet 9 and is engaged by a slidable closure 11 adapted to be moved across the opening 9 and into engagement with a retaining bracket 12, when it is desired to prevent a trapped rodent from leaving through the outlet.

Figures 6, 7:
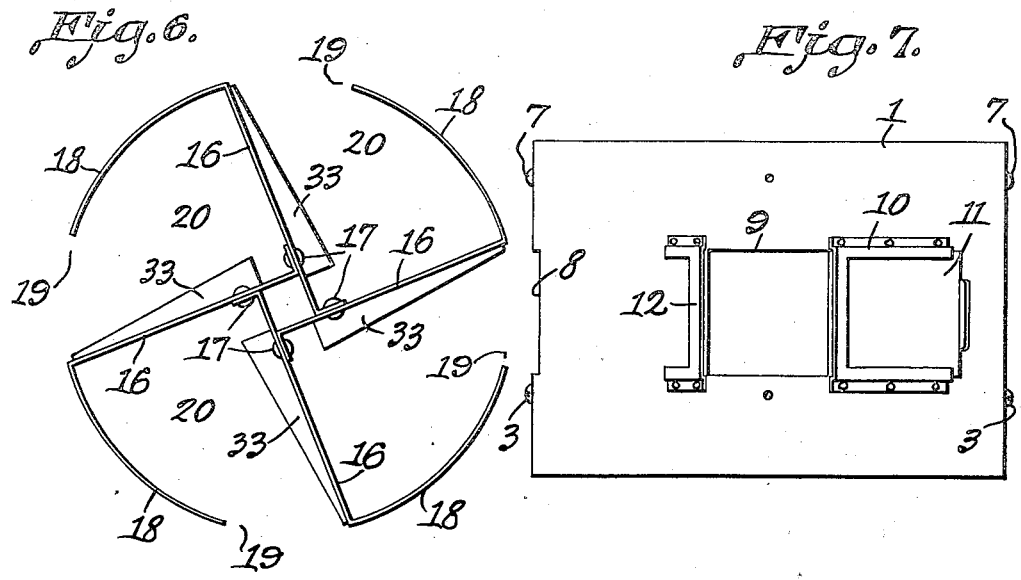
Figure 6 is a plan view of the rotary gate.
Figure 7 is an elevation of the exit of the receiving section.
Figure 8:
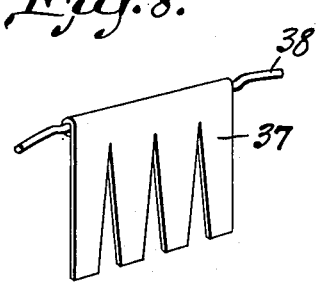
Figure 8 is a perspective of the closure provided at the inlet of the holding section.

A centering tube 13 is secured within the central portion of the bottom 2 and projects upwardly therefrom into the lower end of an upwardly tapered tubular core 14 projecting through an opening 15 at the center of the top 5. To this core are secured the inner end portions of blades 16 which are fastened together, as shown at 17 in Figure 6 to provide a substantially rectangular sleeve which extends around the core 14 to which it is soldered or otherwise attached. These blades or sweeps 16 extend to points close to the inner surface of the wall of section 1 where each of them is provided with an arcuate gate or closure 18 extending in the direction of rotation of the gate but spaced from the blade in advance thereof a sufficient distance to permit a rodent to enter the space between the blades. This space has been indicated at 19 in Figure 6. Preferably four blades 16 are employed, thus providing four separate chambers 20 each having an inlet opening 19.

A coiled spring is arranged within the core 14 as shown at 21, one end being fastened to the upper end of this core while the other end is attached to the centering tube 13.

Formed within the bottom plate 2 adjacent to the wall of section 1 but at one side of the inlet 8 is a slot 22 in which is pivoted a trigger 23 in the form of a flange depending from one side portion of a bait-pan 24. The pivot of this trigger has been indicated at 25 and consists of a pin suitably held to the bottom 2 and bridging the slot 22.

Figure 5:
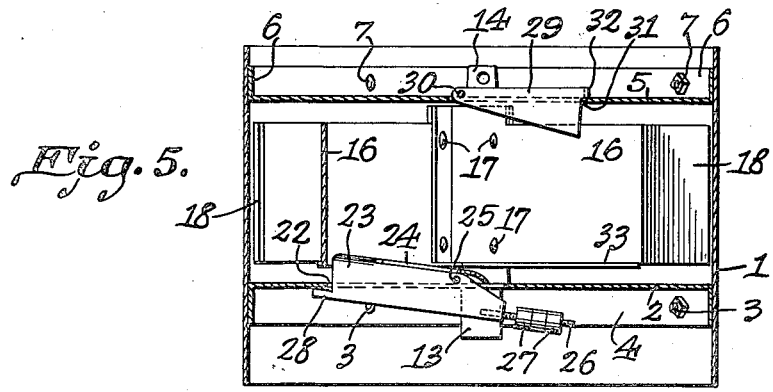
Figure 5 is a vertical section through the holding section showing the trigger and check element in elevation.

A screw-threaded stem 26 extends from one end of the trigger beneath the bottom 2 and is engaged by one or more adjustable nuts 27 constituting weights. The other end of the trigger has a finger 28 projecting therefrom, the weights 27 serving to hold this finger 28 normally pressed upwardly against the bottom 2 as shown in Figure 5. These weights can be adjusted to slightly overbalance any bait which might be placed on the pan 24.

Figure 2:
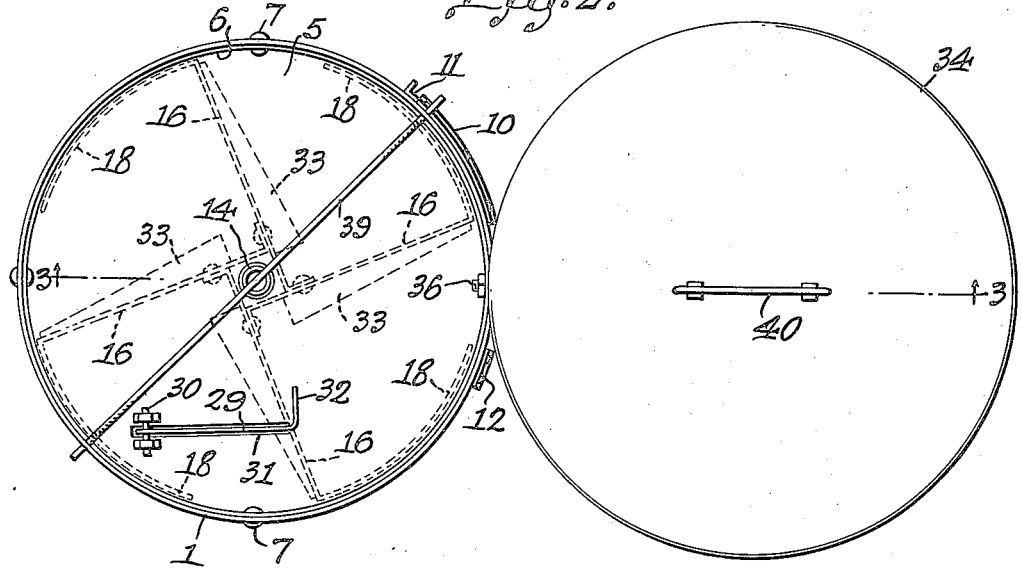
Figure 2 is a plan view thereof.
Figure 3:
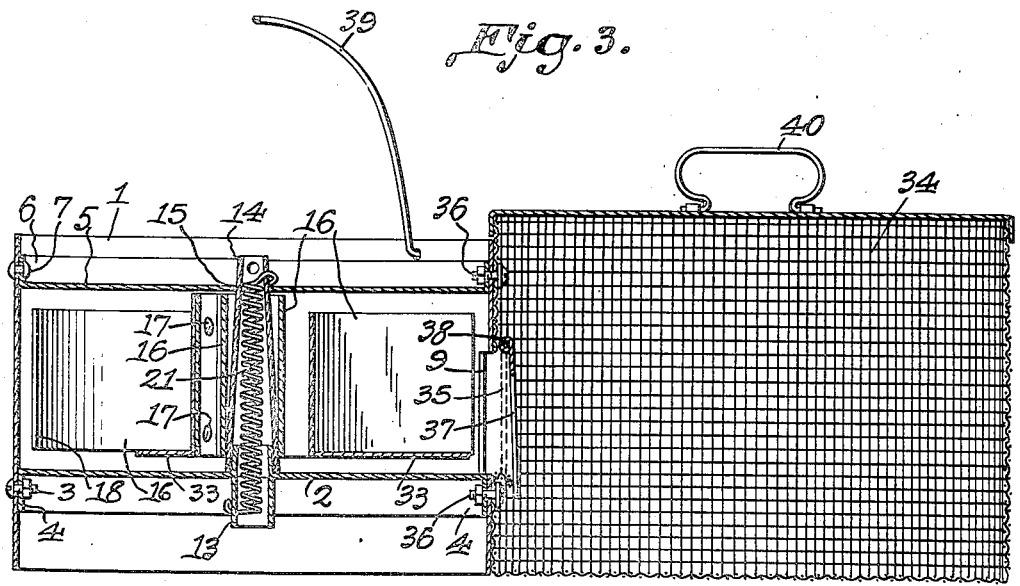
Figure 3 is a section on line 3—3, Figure 2.
Figure 4:
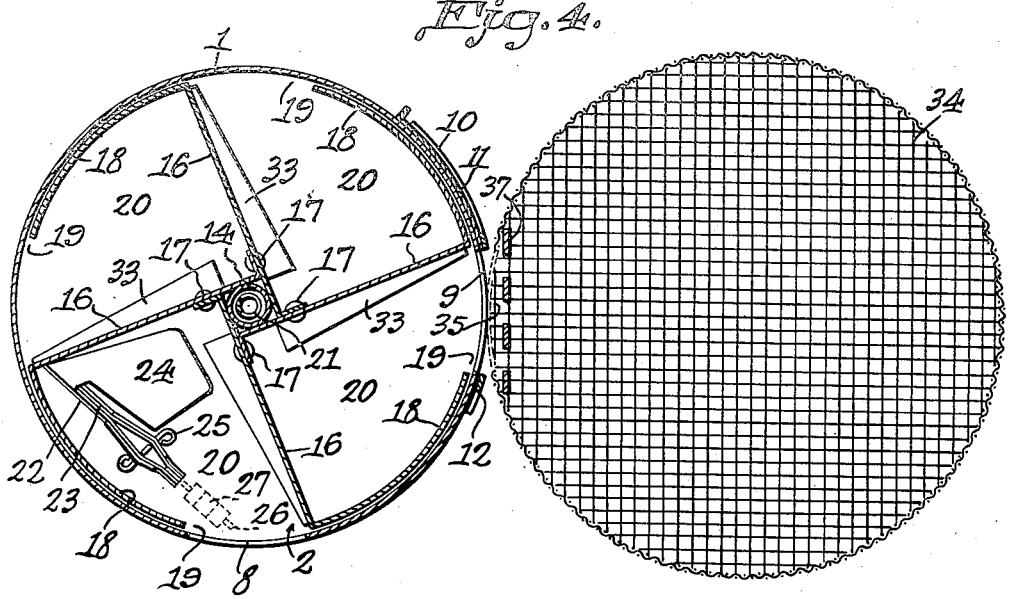
Figure 4 is a section taken on the line 4—4, Figure 1.

When the trigger is in its normal position it projects upwardly into the path of one of the blades or sweeps 16 so that the gate thus is prevented from rotating in one direction. To prevent the gate from rotating in the opposite direction, there is provided a dog 29 pivotally connected at 30 to the top 5 of the section 1 and normally projecting downwardly through a slot 31 in said top 5. A finger 32 serves to limit the downward movement of the dog. The bottom edge of this dog is inclined so that when a blade or sweep moves thereagainst in one direction it will elevate the dog. However after the sweep or blade has passed the dog and the dog has gravitated back to normal position, as shown in Figures 2 and 5, the gate cannot be rotated backwardly, this dog and the trigger 23 at this time serving to hold the gate positively against rotation in either direction.

For the purpose of stiffening each of the blades or sweeps 16, a reenforcing flange 33 can be extended backwardly from each of the blades.

There is used, in connection with section 1, a holding section 34 which can be in the form of a wire basket from which trapped rodents cannot escape. This holding section has an inlet opening 35 adapted to be placed in register with the outlet opening 9, the two sections being held together in any suitable manner, as by means of bolts 36 connecting the walls thereof. A gate 37 is pivotally mounted at its upper end upon a wire 38 extending across the upper end of the inlet 35 and said gate is suspended normally by gravity across the opening and in position to lap the inner surface of the wall of section 34 at a point below inlet 35. Thus while a rodent can pass through the opening 35 into section 34, it cannot return through said opening because the gate 37 will gravitate promptly into position across the opening.

Suitable bails or handles 39 and 40 can be attached to the respective sections 1 and 34 of the trap so that they can be carried either separately or as a single structure.

When it is desired to use the trap the two sections are joined by means of bolts 36 or the like and the gate in section 1 is rotated in a clockwise direction when viewed from the top, thus causing the core 14 also to rotate and to wind spring 21 so as to be placed under tension. As the gate is thus rotated the several blades or sweeps 16 will depress the pan 24 and the trigger 23, it being understood that it is necessary at this time to hold the dog 29 raised out of the path of the blades or sweeps. For this purpose the finger 32 may be easily gripped. After the spring has been wound to obobtain the desired tension, the dog is released and will drop to position behind the adjacent blade or sweep thereby holding the gate against further rotation in the same direction. The trigger 23 of course prevents the gate from rotating in the opposite direction. Suitable bait is placed on the pan 24 and can be so shaped and located thereon that when the pan is fully depressed, the bait will assume a position below the level of the bottom edges of the sweeps or blades. The weights 27 are adjusted to slightly overbalance the bait. When a rodent enters the section 1 through the inlet 8 in an effort to reach the bait, it necessarily depresses the pan 24 and the trigger 23 with the result that the engaged blade or sweep 16 is released and is actuated by the tensioned spring so as to be given an abrupt movement through a part of a circle until brought to a stop by engagement of the next succeeeding blade or sweep with the trigger 23. When the blades are thus actuated, the rodent in the path of the released sweep is swept thereby to a position from which it can leave through the outlet 9, the arcuate wing 18 of said blade in the meantime moving to position across the inlet 8 to prevent the rodent from escaping while it is being swept from one position to another and subsequently opening said inlet to the next succeeding compartment 20. When the rodent trapped in section 1 is brought to the new position, it immediately attempts to escape by passing outwardly through the outlet 9 and thrusting against the gate 37. This gate will swing upwardly readily and the rodent will pass into section 34 but gate 37 will drop back by gravity to close the section so that the rodent thus cannot escape.

With this trap it will be noted that as many as four trapping operations can be effected at one setting.

What is claimed is:

1. A trap including a section having an inlet and an outlet, a gate mounted for rotation in said section and including radial sweeps and a wing at the outer end of each sweep, a trigger for engaging one of the sweeps to hold the gate against rotation in one direction and to maintain the wings at one side of the inlet and the outlet respectively, said trigger being depressible by a rodent entering between the sweeps at the inlet, and means for automatically actuating the gate when the sweep is released to simultaneously close the inlet with one of the wings and force the rodent to a position adjacent to the outlet, and gravity means carried by said section for holding the gate from movement against the action of its operating means.

2. A trap including a section having an inlet and an outlet, a gate mounted for rotation within said section and including radial sweeps and arcuate wings at the outer ends of the sweeps, each wing being spaced from the next adjoining sweep, a trigger for engagement by one of the sweeps to hold the gate against rotation in one direction, bait holding means carried by the trigger, a counterbalance adjustably mounted on the trigger, and a spring for actuating the gate in one direction when the trigger is depressed to simultaneously close the inlet and move a trapped rodent from position adjacent to the inlet to a position adjacent to the outlet.

3. A trap including a section having an inlet and an outlet, a gate mounted for rotation within said section and including radial sweeps and arcuate wings at the outer ends of the sweeps, each wing being spaced from the next adjoining sweep, a trigger for engagement by one of the sweeps to hold the gate against rotation in one direction, bait holding means carried by the trigger, a counterbalance adjustably mounted on the trigger, and a spring for actuating the gate in one direction when the trigger is depressed to simultaneously close the inlet and move a trapped rodent from position adjacent to the inlet to a position adjacent to the outlet, gravity means for engagement by the sweeps for holding the gate against rotation in the opposite direction.

LEW BENSON.